July 1, 1958 — W. G. PAGDIN ET AL — 2,841,433
APPARATUS FOR HANDLING MATERIALS
Filed June 22, 1956 — 5 Sheets-Sheet 1

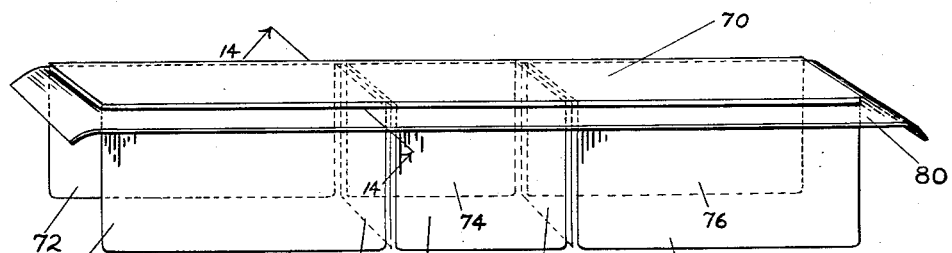
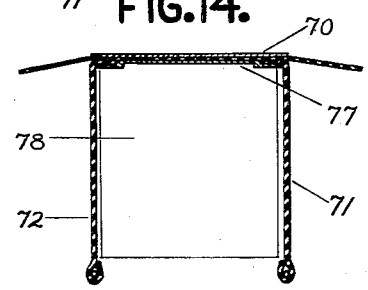
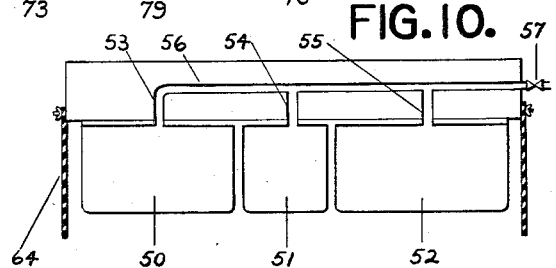
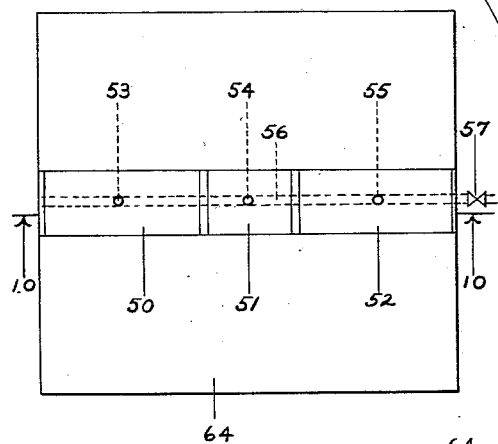
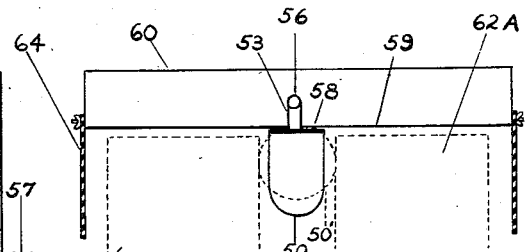
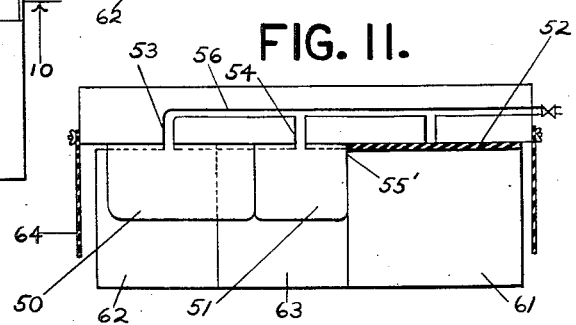

July 1, 1958  W. G. PAGDIN ET AL  2,841,433
APPARATUS FOR HANDLING MATERIALS
Filed June 22, 1956  5 Sheets-Sheet 4

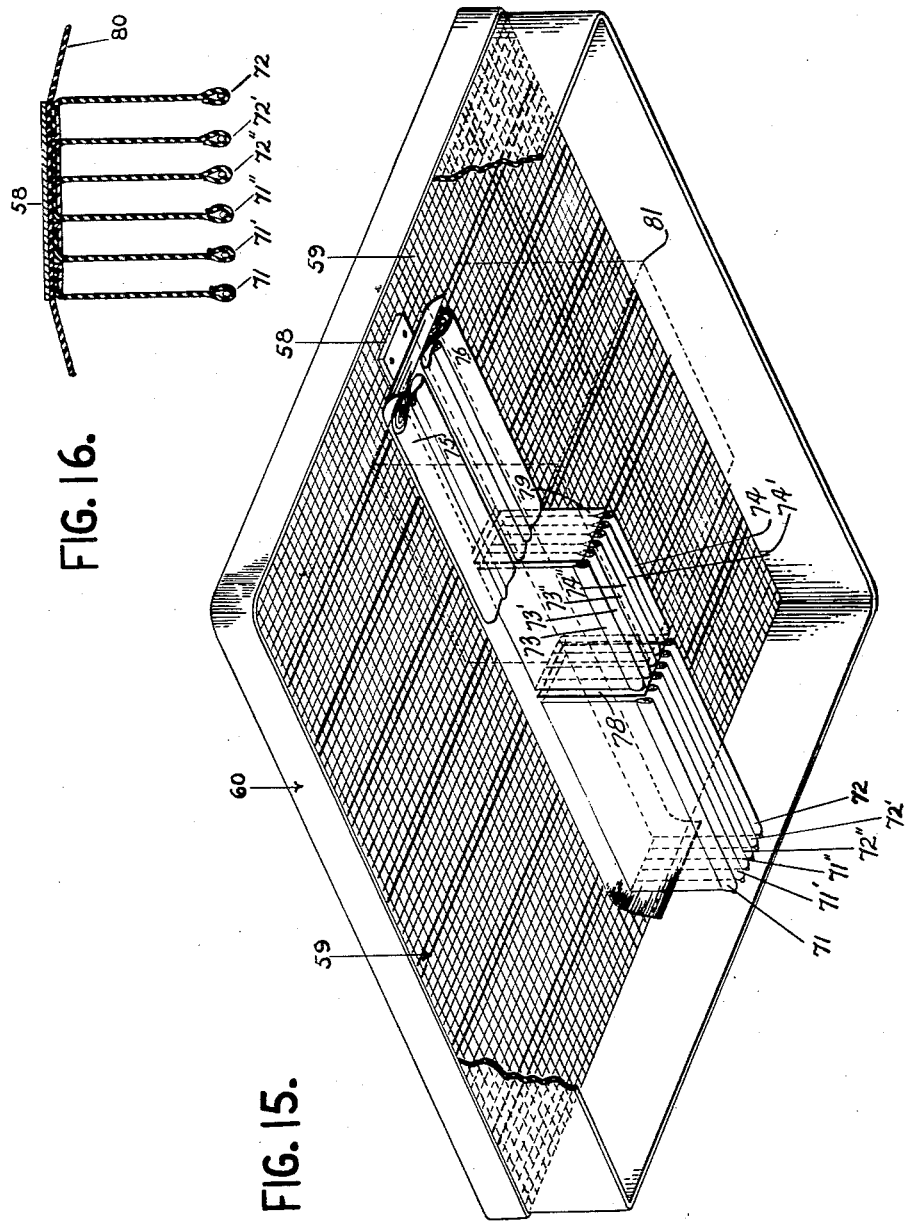

United States Patent Office 2,841,433
Patented July 1, 1958

2,841,433

APPARATUS FOR HANDLING MATERIALS

William G. Pagdin, Little Silver, Henry Macaluso, Clifton, and Francis X. Bulat, Dunellen, N. J., assignors to P. Ballantine & Sons, Newark, N. J., a corporation of New Jersey Application June 22, 1956, Serial No. 593,072

15 Claims. (Cl. 294—65)

The present invention relates to apparatus for handling materials, and more particularly to apparatus for loading and unloading cartons or other units in groups onto or from a pallet or other portable platform.

In Wahl and Winters United States Patent No. 2,716,497, issued August 30, 1955, there is described a suction-type palletizing and depalletizing machine. The present invention is concerned with a machine of this character, and particularly with an improved suction head which is especially adapted for the handling of certain types of loads.

The units forming a tier of a palletized load are generally arranged in a predetermined patterned relation, which may vary from tier to tier. Usually, when any variation exists, alternate tiers are mirror images of each other. It is in many cases undesirable for a pattern of units to be used in which the periphery of a tier is irregular, since in such case interlocking of adjacent stacks may occur during transportation or warehousing. When interlocking of adjacent stacks occurs, loosening of the tier pattern may occur when one stack is removed, as by a fork lift truck. Thus, when the pattern of units forming a tier cannot conveniently be made substantially in rectangular form, any void space in the pattern is preferably located within the periphery of the tier so that the periphery itself may be rectangular in shape.

The present invention is concerned particularly with providing a satisfactory seal between the suction chamber and the internal void space of a patterned tier which is to be palletized or depalletized by a suction-type machine.

A principal object of the invention has been the provision of a novel and improved suction head for suction-type palletizing and depalletizing machines.

More particularly, it has been an object of the invention to provide a suction head for such machines which provides an adequate seal when handling tiers in which the units are arranged in a pattern having an internal void space.

A further object of the invention has been the provision of a suction head for handling tiers having an internal void space in which the location of the void space varies from tier to tier.

A feature of the invention has been the provision of a sealing mechanism for internal void spaces in a tier which can accommodate varying locations and varying sizes of the void space.

Other and further objects, features and advantages of the invention will appear more fully from the following description.

In accordance with the invention, there is provided an apparatus for transferring simultaneously a plurality of units in predetermined patterned relation forming a tier, the pattern of the units having a void space located internally of the periphery of the tier, a suction head for gripping and transferring the tier. The suction head comprises a rigid upper portion having a top member and spacing means located below the top member and having openings therein for the free passage of air therethrough, sealing means depending from the upper portion adjacent the periphery of the tier and being arranged to contact the units forming the periphery of the tier to provide an effective seal along the area of contact, and axiliary sealing means depending from the upper portion in the region of the void space and adapted to contact the units having walls forming the sides of the void space, the auxiliary sealing means being arranged to contact these walls forming the sides of the void space to provide an effective seal along the area of contact thereof.

The invention will now be described in greater detail with reference to the appended drawings, in which:

Fig. 8 is a schematic bottom view of a suction head constructed in accordance with the invention and having provision for sealing an internal void space in the tier;

Fig. 9 is a side elevational view of the suction head of Fig. 8;

Fig. 10 is a sectional view taken alone the line 10—10 of Fig. 8;

Fig. 11 is a sectional view similar to Fig. 10 showing the suction head located in contact with a tier of units;

Fig. 13 is a pictorial view illustrating a modified internal void sealing construction;

Fig. 14 is a cross-sectional view taken along the line 14—14 of Fig. 13;

Fig. 15 is a perspective view of a suction head illustrating a further modification of the internal void sealing construction; and Fig. 16 is a side elevational view of the sealing device of Fig. 15.

Figure 1:
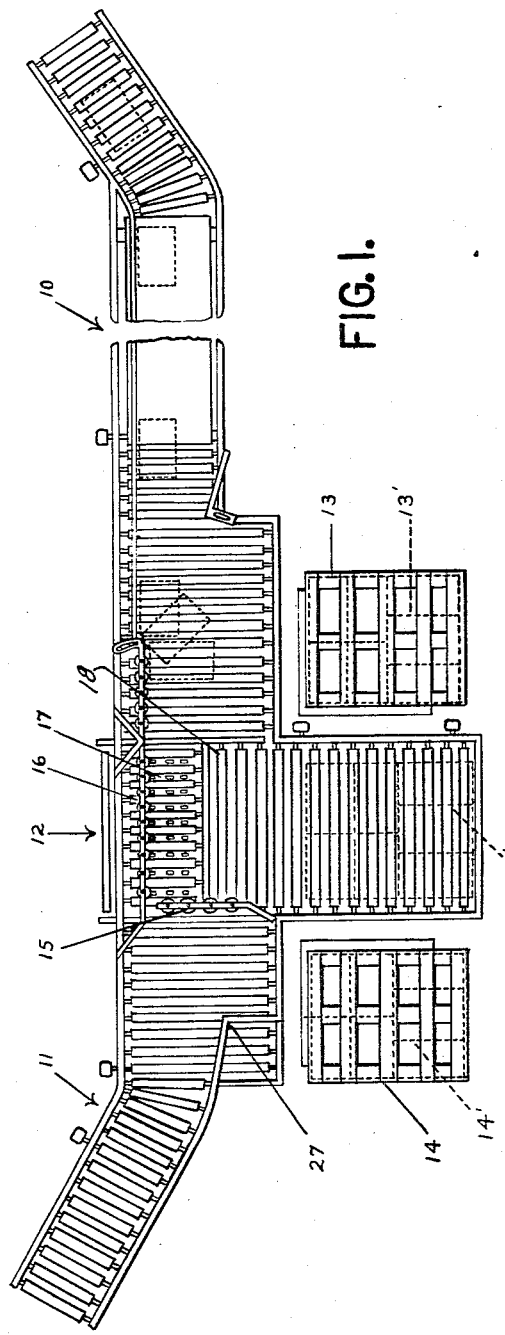
Fig. 1 is a schematic plan view of a suitable palletizing and depalletizing arrangement.

Referring now to the drawings, and more particularly to Fig. 1, there is shown a delivery conveyor system 10, a discharge conveyor system 11, an accumulator table 12 and pallets 13 and 14. The detailed construction and operation of a system such as illustrated in Fig. 1 is set forth in the aforementioned Wahl and Winters patent. Briefly stated, cartons or other units, e. g., bags, boxes, etc., are advanced along the conveyor 10 and onto the rear of the accumulator 12. When a complete row is formed at the rear of the accumulator 12, this row is advanced toward the front of the accumulator 12. When a second complete row is formed at the rear of the accumulator 12, such second row is likewise advanced toward the front of the accumulator. The units contained in one or more rows may be rotated 90° in order to form a desired pattern, as shown in dotted lines at 12', 13' and 14'. When the complete tier is formed in the front of the accumulator table, e. g., three rows, as illustrated at 12', the tier is ready to be moved to either of the pallets 13 or 14.

In the formation of a tier on the accumulator 12, independent units advanced onto the rear of the accumulator 12 are carried toward a stop member 15 by powered rollers 16. When a complete row is formed, skate wheels 17 may be lifted to cause the row to advance onto powered or gravity rollers 18 which carry the row forward on the accumulator table 12.

When a complete tier has been formed at the front of the accumulator table 12, a suction head 19 (Fig. 2) is lowered to the position shown in dotted lines over the accumulator and in which a depending sealing device or member 20 encircles the periphery of the tier. Air is then evacuated from the interior of the suction head by means of a blower 21 which communicates with the suction head through a flexible tube 22. When the suction head 19 is raised, the differential in air pressure acting on the units forming the tier causes the latter to travel with the suction head, which deposits the tier on one of the pallets 13 and 14. Additional tiers may be deposited one on top of the other until a complete pallet load is achieved, at which time loading will be transferred to the other pallet. If desired, the pattern of units forming a tier may be varied to provide an interlocking stack. Thus, in Fig. 2 the tiers 23 have a different pattern than the tier 25. When a tier has reached its desired position on or over the pallet, the suction is released and the suction head 19 is returned to the full line position preparatory to picking up another tier.

In the depalletizing or unloading operation, a loaded pallet is unloaded by the suction head 19, which grasps the top tier on the pallet, raises it, moves it to a position over the front of the accumulator table 12, and lowers it onto the accumulator table 12. Suction is then released, depositing the tier, and the suction head 19 returns to a position over the pallet to pick up the next tier. In the meantime the deposited tier is moved to the rear of the accumulator table 12 under action of the powered rollers 18 and the rows are discharged one by one to the conveyor section 10. For discharging onto the conveyor section 11 instead of section 10, the stop member 15 will, of course, be removed. To facilitate the discharge of the rows one by one, stop members may be interposed in the path of the second and subsequent rows to stop their movement until preceding rows have been discharged. If desired, such means as the corner member 27 may be provided to turn units oriented in one direction so that all units carried on the discharge conveyor 11 will be similarly oriented.

Figure 3:
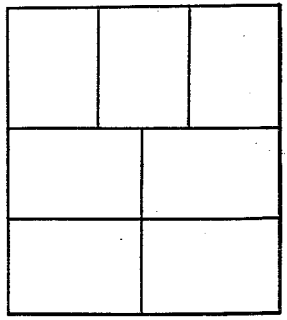
Figs. 3 and 4 are plan views of tiers of units in which no internal void space occurs.
Figure 4:
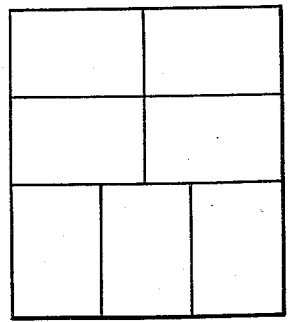

Referring now to Figs. 3 and 4, there are shown two reverse patterns of units forming a tier. Each of the tiers illustrated in these figures has seven units. For convenience, the units in the drawings have been illustrated as cartons or boxes, although it will be understood that a variety of other units may be handled by the apparatus of the invention. A tier may, of course, be made of any convenient number of units. The peripheral sides of the tiers of Figs. 3 and 4 define a rectangle. If the units making up these tiers were slightly wider or slightly narrower than illustrated for the same lengths, the tier peripheries would not outline exactly a rectangle. For example, in Fig. 5, in which the units are wider with respect to length than in Fig. 3, the shaded areas designated 30 and 31 prevent the outline of the tier from being a true rectangle. When stacks of tiers are placed next to each other, as in warehousing or transportation, shoulders corresponding to the shoulders 32 and 33 in adjacent stacks have a tendency to interlock, so that when one stack is removed adjacent stacks on either side may be disturbed, and the tight pattern of units may be considerably loosened, thereby reducing the stability of the stacks. Stacks made up of loosely patterned units have a tendency to come apart while being transferred.

Figures 6, 6A:
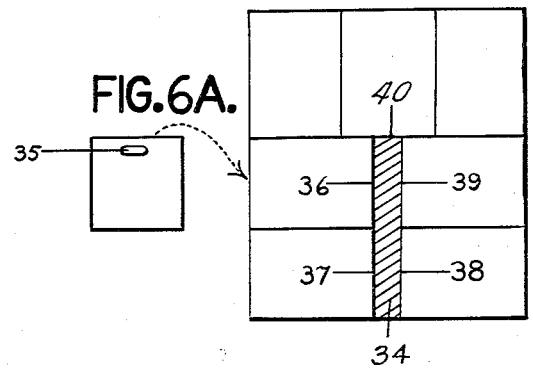
Fig. 6 is a plan view of a tier similar to Fig. 5 but with an internal void space and a regular periphery.
Fig. 6A is a side view of one of the units of Fig. 6.
Figure 5:
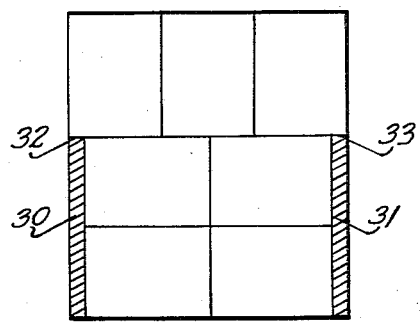
Fig. 5 is a plan view of a tier similar to Fig. 3 but in which the sizes of the units are such that the periphery of the tier is irregular.

If the pattern of the tier of Fig. 5 is rearranged so that the areas 30 and 31 are combined and appear within the periphery of the tier, as shown in Fig. 6, there will be no difficulty experienced in adjacent stacks interlocking. A pattern of the type shown in Fig. 6 with an internal void space can easily be created by providing suitable stop members (not shown) at the rear of the accumulator table 12 in Fig. 1 so that units in selected rows can be separated.

It has been found that stability of a palletized stack is considerably increased by having alternate tiers arranged oppositely. For example, if the tier of Fig. 6 is placed on a pallet, the next tier thereabove might have the mirror image pattern of Fig. 7. The succeeding tier would again have the pattern of Fig. 6, and so on.

In the packaging of many commodities, particularly where open top cartons are employed, hand holes are often provided in opposite side walls of each carton. The side of such a carton having a hand hole 35 is illustrated in Fig. 6A. Fig. 6A represents the side wall of one of the cartons of Fig. 6, as indicated by the dotted line joining Figs. 6A and 6. It will be evident from Fig. 6 that five hand holes may be exposed to the void space 34, these hand holes being in the walls 36, 37, 38, 39 and 40. Similar hand holes will appear in the walls 41, 42, 43, 44 and 45 opening onto the void space 46 of Fig. 7, which corresponds to the void space 34 of Fig. 6.

Figure 7:
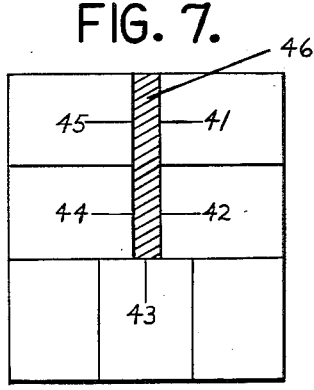
Fig. 7 is a plan view of a tier similar to Fig. 6 but with the units arranged in an opposite sense.

It will be evident that the edges of the void spaces 34 and 46 must be sealed off from the suction head in order to prevent undue loss of suction from air leakage along the edges of the units surrounding these void spaces. Furthermore, when hand holes are provided, not only must the seal be maintained between the units and the suction head, but also the hand holes should be closed off. A further complication exists when successive tiers are changed end for end, as in Figs. 6 and 7, since the sealing mechanism provided to seal off the void space 34 must also be able to seal off the void space 46 without adjustment. Examination of Figs. 6 and 7 will show that there is some overlapping between the void spaces 34 and 46. For example, if the cartons of Figs. 6 and 7 are 12½ inches wide and 17 inches long, which is a common size employed in handling steinie quarts of beer, it will be seen that this overlapping will amount to 8 inches. A "steinie" is a short squat short-necked bottle as distinguished from a long thin long-necked bottle.

In accordance with the invention, the void spaces in the patterns may be sealed off from the suction head by providing sealing means depending from the suction head in the region of the void spaces. One embodiment of the sealing means of the invention is illustrated in Figs. 8 to 12, inclusive.

Referring now to Fig. 8, this sealing means comprises three depending sausage-like chambers 50, 51 and 52. These chambers, which may be made from rubber sheeting or other resilient expandable material, are preferably airtight and are interconnected by tubes 53, 54 and 55 which communicate with a common header 56. The header 56 is provided with a valve 57 which permits external air to be admitted to the chambers 50, 51 and 52, permits compensation for changes in internal pressure, and permits air to be evacuated from the chambers.

Figure 2:
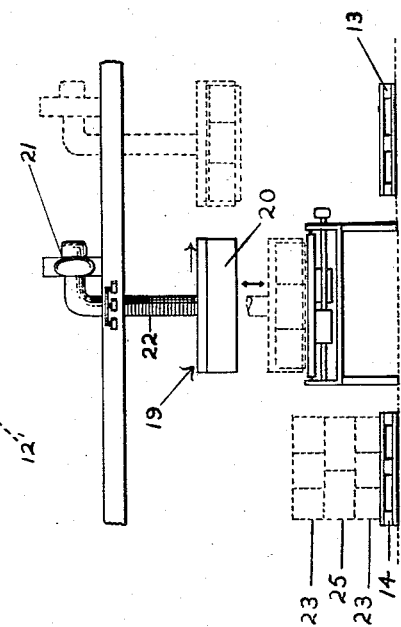
Fig. 2 is a schematic elevational view illustrating a typical loading or palletizing operation.

The chambers 50, 51 and 52 may be affixed to a plate 58, which may be bolted or otherwise affixed to a grating 59 forming the bottom wall of the suction chamber within suction head 60 (corresponding to suction head 19 of Fig. 2). If desired, the grating 59 may be recessed so as to accommodate the plate 58. In such case, the bottom of plate 58 will be flush with the bottom surface of the grating. The chambers 50, 51 and 52 depend from the grating 59 in a space corresponding to the void spaces 34 and 46 of Figs. 6 and 7. The chamber 51 is preferably the same length as the common length of the void spaces 34 and 46. In the steinie quart carton, the example mentioned, the chamber 51 would thus be 8 inches long. The chambers 50 and 52 will each be of the same length, which is preferably equal to the remaining width of the suction head. In the example mentioned, the chambers 50 and 52 would each be 17 inches long.

When the suction head is lowered into contact with a tier, the chambers 50 and 51, or the chambers 52 and 51, as the case may be, will enter the void space. The remaining chamber 50 or 52 will be collapsed by the unit located at the end of the void space, e. g., the units having the walls 40 or 43 of Figs. 6 and 7. This situation is clearly illustrated in Fig. 11, in which the chamber 52 is collapsed by a carton 61 while the chambers 50 and 51 extend into the void space between cartons 62 and 63 on one side, and the corresponding cartons (not shown) on the other side, of the void space. Collapse of the chamber 52 causes the air therein to pass out through the tube 55, the header 56, and the tubes 53 and 54, into the chambers 50 and 51, causing the latter to expand in the manner of a balloon. As shown in Fig. 9, the chamber 50 assumes a generally circular cross section indicated at 50'. The walls of the expanded chambers are constrained by the walls of the units abutting the void space. In Fig. 9 the expanded chamber 50' will be seen to be firmly in contact with the walls of the cartons 62 and 62A. The expandable chambers should be sufficiently large so that, when expanded, they will completely seal off the hand holes (if any) provided in the sides of the cartons abutting the void space.

When suction is applied, a flexible curtain 64, which depends from the top of the suction head 60, will be drawn into sealing engagement with the sides of the units forming the periphery of the tier. The interior of the void space, which is located within this periphery, will be sealed off from the suction chamber defined by the top of the suction head and the tops of the units forming a tier, so that the differential in air pressure between the suction chamber and the bottom of the tier can be maintained. The chambers 50 and 51, in addition to expanding in cross section, will also expand slightly in length, and will enter into sealing engagement with each other. Lengthwise expansion of the chamber 51 will cause this chamber also to seal the hand hole, if any, in the carton 61.

An example of the expansion of the uncollapsed chambers to be expected is as follows: Assuming two 17 inch chambers and one 8 inch chamber, each 1¾ inches wide and 6 inches deep, the total volume of the three chambers will be approximately 441 cubic inches. When the head comes down on the tier, one of the cartons collapses one of the 17 inch chambers. The air in the collapsed chamber will be immediately transferred to the other two chambers, whose volume is approximately 263 cubic inches. Thus, 442 cubic inches of air will have to be accommodated in two chambers having a total volume of 263 cubic inches. The result will be that the two uncollapsed chambers will expand in order to accept this additional air. The cross-sectional area of the uncollapsed chambers will tend to increase from about 10½ square inches to about 17½ square inches.

While the center chamber 51 is preferably the same size as the overlapping portions of the void spaces, this is not necessarily the case, since adequate sealing will be achieved if a portion only of the chamber 50 or 52 is collapsed, or, alternatively, if the entire chamber 50 or the entire chamber 52 and a portion of the chamber 51 is collapsed. Where interlocking patterns are not used, satisfactory results can be achieved with two sausages, one being completely collapsed and the other completely expanded. While it is preferable to provide separate chambers, as illustrated, a single sausage-like chamber extending the full width of the suction head may be provided. In such case, no tubes will be required to interconnect chambers. In place of the tubes 53, 54 and 55 and the header 56, the chambers 50 and 51, and 51 and 52, may be interconnected through small passages.

In the event that a pattern without an internal void space, e. g., patterns such as those of Figs. 3 and 4, is to be handled, the auxiliary sealing means may easily be removed by removing the plate 58. If a pattern with a void space not located at the center of the pattern is handled, the depending auxiliary sealing means may be appropriately located by moving the plate 58. A pattern without an internal void space may also be handled by evacuating the air in the chambers 50, 51 and 52 and then closing the valve 57 so that the chambers will not interfere with operation of the suction head.

Figure 12:
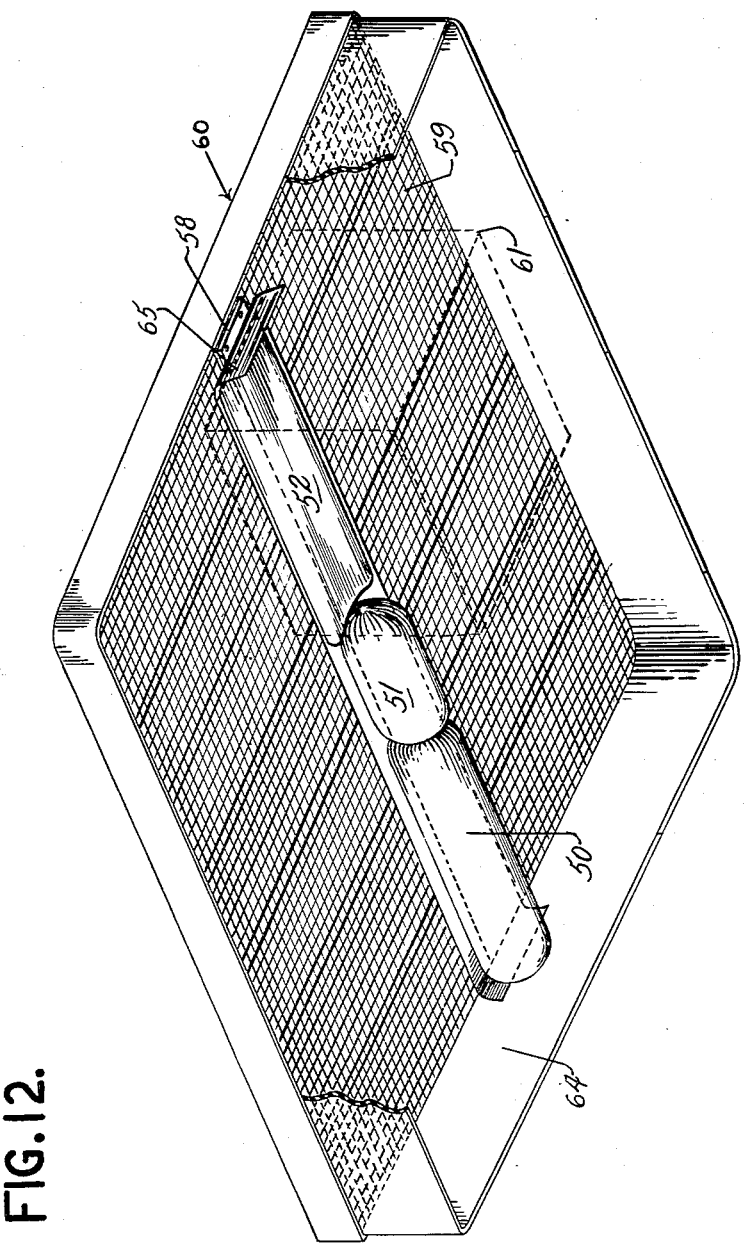
Fig. 12 is a perspective view of the bottom of a suction head of the type shown in Figs. 8, 9 and 10.

Sealing along the top edges of the cartons surrounding the void space may be further improved by providing a rubber or other resilient member 65 (Fig. 12). The sealing member 65 may be affixed to the plate 58 and will lie between the grating 59 and the tops of the units adjacent the chambers 50, 51 and 52. The ends of the sealing member 65 may be allowed to depend from the plate 58 to provide a seal along the vertical edges of the units adjacent the void space, thus aiding the curtain 64 in providing a seal at this point. This will assist in overcoming any tendency for the curtain 64 to be drawn into the void space.

Also in accordance with the invention, sealing of the internal void space within the pattern may be achieved as shown in Figs. 13 and 14. In this arrangement, a plate 70, which corresponds to the plate 58, is suitably affixed to (or may be recessed into) the grating 59, and thus depends from the upper portion of the suction head. For convenience, the suction head has been omitted from Figs. 13 and 14. The plate 70 will be located in the same way as the plate 58. In Fig. 13, the chambers 50, 51 and 52 are replaced with pairs of depending curtains 71 and 72, 73 and 74, and 75 and 76. As shown in Fig. 14, these depending curtains may be held in place by a metal bracket 77, which may be bolted or otherwise affixed to the plate 70. The curtains 71 and 72 and 73 and 74 define chambers separated by a depending crosswise curtain 78. The curtain 78 may be affixed to the plate 77, but is free along its vertical sides and bottom. The chambers defined by curtains 73 and 74 and 75 and 76 are similarly separated by a depending crosswise curtain 79. The various curtains may be weighted, as illustrated, to insure their remaining in vertical position as the suction head descends into contact with a tier. The curtains 78 and 79 are preferably located at the ends of the overlapping portion of the void spaces of the interlocking patterns to be handled. The curtains 78 and 79 are intended to seal the hand hole of the carton located at the end of the void space. The depending curtains 71 and 72, or 75 and 76, will be engaged by the top of the carton at the end of the void space and will be collapsed. The other pair of these curtains and the curtains 73 and 74 will enter the void space and, when suction is applied, will be drawn against the side walls of the cartons located around the void space. At the same time the curtain 78, or the curtain 79, will be drawn against the side walls of the carton at the end of the void space and will act to seal off the hand hole in such wall as well as the top of the carton itself. Additional sealing action at the tops of the cartons around the void space is provided by a rubber or other suitable flap 80, which extends generally horizontally and is supported between the plates 70 and 77. The ends of the flap 80 are left free, as in the case of the flap 65 of Fig. 12.

When void spaces of varying width are to be accommodated, a multiple number of pairs of flaps may be provided for each chamber instead of the single pair of flaps, such as 71 and 72. This arrangement is illustrated in Fig. 15, in which the curtains 71 and 72 are located on the outside and within, and parallel thereto are provided flaps 71', 71", 72' and 72". Similarly, flaps 73', 73", 74' and 74" are provided in addition to curtains 73 and 74. Similar additional flaps are provided in addition to the curtains 75 and 76, but these are shown collapsed by a carton 81 which corresponds to the carton 61 of Fig. 11 and 61' of Fig. 12. A sectional view showing the flaps 71, 71', 71", 72, 72' and 72" is illustrated in Fig. 16.

While the invention has been described in the specific

What is claimed is:

1. In apparatus for transferring simultaneously a plurality of units in predetermined patterned relation forming a tier, the pattern of said units having a void space located internally of the periphery of said tier, a suction head for gripping said tier comprising a rigid upper portion having a top member and spacing means located below said top member and having openings therein for the free passage of air therethrough, sealing means depending from said upper portion adjacent the periphery of said tier and being arranged to contact the units forming the periphery of said tier to provide an effective seal along the area of contact, and auxiliary sealing means having a plurality of flexible wall contacting surfaces depending from said upper portion in the region of said void space and adapted to contact the units having walls forming the sides of said void space, said auxiliary sealing means being arranged so that said wall contacting surfaces thereof contact said walls forming the sides of said void space to provide an effective seal along the area of contact thereof.

2. In apparatus for transferring simultaneously a plurality of units in predetermined patterned relation forming a tier, the pattern of said units having a void space located internally of the periphery of said tier, a suction head for gripping said tier comprising a rigid upper portion having a top member and spacing means located below said top member and having openings therein for the free passage of air therethrough, sealing means depending from said upper portion adjacent the periphery of said tier and being arranged to contact the units forming the periphery of said tier to provide an effective seal along the area of contact, and auxiliary sealing means comprising an elongated, flexible, expansible, air-tight member depending from said upper portion in the region of said void space and adapted to contact the units having walls forming the sides of said void space, said elongated member being arranged to contact said walls forming the sides of said void space to provide an effective seal along the area of contact thereof.

3. In apparatus for transferring simultaneously a plurality of units in predetermined patterned relation forming a tier, the pattern of said units having a void space located internally of the periphery of said tier, a suction head for gripping said tier comprising a rigid upper portion having a top member and spacing means located below said top member and having openings therein for the free passage of air therethrough, sealing means depending from said upper portion adjacent the periphery of said tier and being arranged to contact the units forming the periphery of said tier to provide an effective seal along the area of contact, and auxiliary sealing means comprising a plurality of elongated, flexible, expansible, air-tight members disposed end-to-end, at least one of said elongated members depending from said upper portion in the region of said void space and being arranged, when expanded, to contact the walls of the units forming the sides of said void space to provide an effective seal along the area of contact thereof, at least another one of said elongated members depending from said upper portion in a region between said void space and the periphery of said tier and an air passage for communication between said one elongated member and said other elongated member so that said one elongated member is caused to expand by air driven from said other elongated member by collapse of said other elongated member when the latter is compressed between said spacing means and the tops of some of said units.

4. In apparatus for transferring simultaneously a plurality of units in predetermined patterned relation forming a tier, the pattern of said units having a void space located internally of the periphery of said tier, said void space extending inwardly from one side of the tier for one pattern and inwardly from the opposite side of the tier for another pattern, the void spaces of said patterns having an overlapping length, a suction head for gripping said tier comprising a rigid upper portion having a top member and spacing means located below said top member and having openings therein for the free passage of air therethrough, sealing means depending from said upper portion adjacent the periphery of said tier and being arranged to contact the units forming the periphery of said tier to provide an effective seal along the area of contact, and auxiliary sealing means comprising three elongated, flexible, expansible, air-tight members disposed end-to-end and depending from said upper portion, the middle one of said elongated members being located in the region corresponding to said overlapping length and the others of said elongated members being located in regions corresponding to respective non-overlapping lengths of said void spaces of said patterns, said middle elongated member and one of said other elongated members being arranged to enter the void space of the pattern of the tier being grasped and being adapted, when expanded, to contact in sealing manner the walls of the units forming the sides of said void space, the other of said elongated members being adapted to be collapsed between the top of at least one of said units and said spacing means, and an air passage interconnecting said elongated members whereby collapse of said other elongated member causes said expansion of the two elongated members within said void space.

5. In apparatus for transferring simultaneously a plurality of units in predetermined patterned relation forming a tier, the pattern of said units having a void space located internally of the periphery of said tier, said void space extending inwardly from one side of the tier for one pattern and inwardly from the opposite side of the tier for another pattern, the void spaces of said patterns having an overlapping length, a suction head for gripping said tier comprising a rigid upper portion having a top member and spacing means located below said top member and having openings therein for the free passage of air therethrough, sealing means depending from said upper portion adjacent the periphery of said tier and being arranged to contact the units forming the periphery of said tier to provide an effective seal along the area of contact, a plate member depending from said spacing means and extending across the bottom of said suction head over areas corresponding to the void spaces of said patterns, and auxiliary sealing means comprising three elongated, flexible, expansible, air-tight members disposed end-to-end and depending from said plate member, the middle one of said elongated members being located in the region corresponding to said overlapping length and the end ones of said elongated members being located in regions corresponding to respective non-overlapping lengths of said void spaces of said patterns, said middle elongated member and one of said end elongated members being arranged to enter the void space of the pattern of the tier being grasped and being adapted, when expanded, to contact in sealing manner the walls of the units forming the sides of said void space, the other of said end elongated members being adapted to be collapsed between the top of at least one of said units and said plate member, and an air passage interconnecting said elongated members whereby collapse of said other elongated member causes air from said collapsed elongated member to enter the other elongated members thereby causing said expansion of the two elongated members within said void space.

6. In apparatus for transferring simultaneously a plurality of units in predetermined patterned relation forming a tier, the pattern of said units having an elongated void space located internally of the periphery of said tier, said void space extending inwardly from one side of the tier for one pattern and inwardly from the opposite side of the tier for another pattern, the void spaces of said patterns having an overlapping length, a suction head for gripping said tier comprising a rigid upper portion having a top member and spacing means located below said top member and having openings therein for the free passage of air therethrough, sealing means depending from said upper portion adjacent the periphery of said tier and being arranged to contact the units forming the periphery of said tier to provide an effective seal along the area of contact, and auxiliary sealing means comprising three elongated, flexible, expansible, air-tight, sausage-like members disposed end-to-end and depending from said upper portion, the middle one of said elongated members being located in the region corresponding to said overlapping length and the end ones of said elongated members being located in regions corresponding to respective non-overlapping lengths of said void spaces of said patterns, said middle elongated member and one of said end elongated members being arranged to enter the void space of the pattern of the tier being grasped and being adapted, when expanded, to contact in sealing manner the walls of the units forming the sides of said void space, the other end one of said elongated members being adapted to be collapsed between the top of at least one of said units and said spacing means, an air passage interconnecting said elongated members whereby collapse of said other elongated member causes said expansion of the two elongated members within said void space, and a normally closed valve communicating with said air passage.

7. In apparatus for transferring simultaneously a plurality of units in predetermined patterned relation forming a tier, said units having hand holes in opposite side walls thereof, the pattern of said units having a void space located internally of the periphery of said tier, said void space extending inwardly from one side of the tier for one pattern and inwardly from the opposite side of the tier for another pattern, the void spaces of said patterns having an overlapping length, at least one of said hand holes communicating with said overlapping length, a suction head for gripping said tier comprising a rigid upper portion having a top member and spacing means located below said top member and having openings therein for the free passage of air therethrough, sealing means depending from said upper portion adjacent the periphery of said tier and being arranged to contact the units forming the periphery of said tier to provide an effective seal along the area of contact, and auxiliary sealing means comprising three elongated, flexible, expansible, air-tight members disposed end-to-end and depending from said upper portion, the middle one of said elongated members being located in the region corresponding to said overlapping length and the others of said elongated members being located in regions corresponding to respective non-overlapping lengths of said void spaces of said patterns, said middle elongated member and one of said other elongated members being arranged to enter the void space of the pattern of the tier being grasped and being adapted, when expanded, to contact in sealing manner the walls of the units forming the sides of said void space and including said one hand hole, the other of said elongated members being adapted to be collapsed between the top of at least one of said units and said spacing means, and an air passage interconnecting said elongated members whereby collapse of said other elongated member causes said expansion of the two elongated members within said void space.

8. In apparatus for transferring simultaneously a plurality of units in predetermined patterned relation forming a tier, the pattern of said units having a void space located internally of the periphery of said tier, said void space extending inwardly from one side of said tier, a suction head for gripping said tier comprising a rigid upper portion having a top member and spacing means located below said top member and having openings therein for the free passage of air therethrough, primary sealing means depending from said upper portion adjacent the periphery of said tier and being arranged to contact the units forming the periphery of said tier to provide an effective seal along the area of contact, first auxiliary sealing means having a plurality of flexible wall contacting surfaces depending from said upper portion in the region of said void space and adapted to contact the units having walls forming the sides of said void space, said first auxiliary sealing means being arranged so that said wall contacting surface thereof contact said walls forming the sides of said void space to provide an effective seal along the area of contact thereof, and second auxiliary sealing means comprising a flexible element depending from said upper portion adjacent the periphery of said tier in the region of said void space and being arranged to assist said primary sealing means in providing an effective seal at the periphery of said tier in said region.

9. In apparatus for transferring simultaneously a plurality of units in predetermined patterned relation forming a tier, the pattern of said units having a void space located internally of the periphery of said tier, a suction head for gripping said tier comprising a rigid upper portion having a top member and spacing means located below said top member and having openings therein for the free passage of air therethrough, sealing means depending from said upper portion adjacent the periphery of said tier and being arranged to contact the units forming the periphery of said tier to provide an effective seal along the area of contact, and auxiliary sealing means comprising a pair of flexible curtains depending from said upper portion in the region of said void space and each being adapted to contact the units having walls forming a respective side of said void space, said auxiliary sealing means being arranged to contact said walls forming the sides of said void space to provide an effective seal along the area of contact thereof.

10. In apparatus for transferring simultaneously a plurality of units in predetermined patterned relation forming a tier, the pattern of said units having a void space located internally of the periphery of said tier, a suction head for gripping said tier comprising a rigid upper portion having a top member and spacing means located below said top member and having openings therein for the free passage of air therethrough, sealing means depending from said upper portion adjacent the periphery of said tier and being arranged to contact the units forming the periphery of said tier to provide an effective seal along the area of contact, and auxiliary sealing means comprising a plurality of pairs of flexible curtains, each pair being arranged end-to-end, depending from said upper portion in the region of said void space and being adapted to contact the units having walls forming the sides of said void space, said curtains being arranged to contact said walls forming the sides of said void space to provide an effective seal along the area of contact thereof.

11. In apparatus for transferring simultaneously a plurality of units in predetermined patterned relation forming a tier, the pattern of said units having a void space located internally of the periphery of said tier, said void space extending inwardly from one side of the tier for one pattern and inwardly from the opposite side of the tier for another pattern, the void spaces of said patterns having an overlapping length, a suction head for gripping said tier comprising a rigid upper portion having a top member and spacing means located below said top member and having openings therein for the free passage of air therethrough, sealing means depending from said upper portion adjacent the periphery of said tier and being arranged to contact the units forming the periphery of said tier to provide an effective seal along the area of contact, and auxiliary sealing means comprising three pairs of flexible curtains disposed end-to-end and depending from said upper portion, the middle one of said pairs being located in the region corresponding to said overlapping length and the others of said pairs being located in regions corresponding to respective non-overlapping lengths of said void spaces of said patterns, said middle pair and one of said other pairs being arranged to enter the void space of the pattern of the tier being grasped and being adapted, when suction is applied to said suction head, to contact in sealing manner the walls of the units forming the sides of said void space, the other of said pair being adapted to be collapsed between the top of at least one of said units and said spacing means.

12. In apparatus for transferring simultaneously a plurailty of units in predetermined patterned relation forming a tier, the pattern of said units having a void space located internally of the periphery of said tier, said void space extending inwardly from one side of the tier for one pattern and inwardly from the opposite side of the tier for another pattern, the void spaces of said patterns having an overlapping length, a suction head for gripping said tier comprising a rigid upper portion having a top member and spacing means located below said top member and having openings therein for the free passage of air therethrough, sealing means depending from said upper portion adjacent the periphery of said tier and being arranged to contact the units forming the periphery of said tier to provide an effective seal along the area of contact, and auxiliary sealing means comprising three groups of flexible curtains disposed end-to-end and depending from said upper portion, the middle one of said groups being located in the region corresponding to said overlapping length and the others of said groups being located in regions corresponding to respective non-overlapping lengths of said void spaces of said patterns, at least some of the curtains of said middle group and at least some of the curtains of one of said other groups being arranged to enter the void space of the pattern of the tier being grasped and being adapted, when suction is applied to said suction head, to contact in sealing manner the walls of the units forming the sides of said void space, the other of said groups being adapted to be collapsed between the top of at least one of said units and said spacing means.

13. Apparatus as set forth in claim 11 in which an additional pair of curtains depends from said upper portion, said additional pair of curtains being disposed crosswise relative to said other curtains and each of the curtains of said additional pair being located between a respective one of the end pairs of curtains and the middle pair of curtains.

14. Apparatus as set forth in claim 12 in which a pair of curtains depends from said upper portion, said pair of curtains being disposed crosswise relative to the curtains of said groups and each of the curtains of said pair being located between a respective one of the end groups of curtains and the middle groups of curtains.

15. In apparatus for transferring simultaneously a plurality of units in predetermined patterned relation forming a tier, said units having hand holes in opposite side walls thereof, the pattern of said units having a void space located internally of the periphery of said tier, said void space extending inwardly from one side of the tier for one pattern and inwardly from the opposite side of the tier for another pattern, the void spaces of said patterns having an overlapping length, at least one of said hand holes communicating with said overlapping length, a suction head for gripping said tier comprising a rigid upper portion having a top member and spacing means located below said top member and having openings therein for the free passage of air therethrough, sealing means depending from said upper portion adjacent the periphery of said tier and being arranged to contact the units forming the periphery of said tier to provide an effective seal along the area of contact, and auxiliary sealing means comprising three pairs of flexible curtains disposed end-to-end and depending from said upper portion, the middle one of said pairs being located in the region corresponding to said overlapping length and the others of said pairs being located in regions corresponding to respective non-overlapping lengths of said void spaces of said patterns, said middle pair and one of said other pairs being arranged to enter the void space of the pattern of the tier being grasped and being adapted, when suction is applied to said suction head, to contact in sealing manner the walls of the units forming the sides of said void space, the other of said pairs being adapted to be collapsed between the top of at least one of said units and said spacing means, and an additional pair of curtains depending from said upper portion, the curtains of said additional pair being disposed crosswise relative to said other curtains, each one of said additional curtains being located between a respective end pair of curtains and said middle pair of curtains and being adapted to enter said void space and, when suction is applied to said suction head, to seal said hand hole.

References Cited in the file of this patent

UNITED STATES PATENTS

| | | |
|---|---|---|
| 1,514,036 | Debaecker | Nov. 4, 1924 |
| 2,716,497 | Wahl et al. | Aug. 30, 1955 |